US012484882B2

(12) United States Patent
Wang et al.

(10) Patent No.: US 12,484,882 B2
(45) Date of Patent: Dec. 2, 2025

(54) ULTRASOUND BEAMFORMING METHOD, SYSTEM, AND COMPUTER-READABLE MEDIUM FOR SUPPRESSING CLUTTER

(71) Applicant: VINNO TECHNOLOGY (SUZHOU) CO., LTD., Jiangsu (CN)

(72) Inventors: Li Wang, Suzhou (CN); Jianjun Guo, Suzhou (CN); Dajun Yin, Suzhou (CN)

(73) Assignee: VINNO TECHNOLOGY (SUZHOU) CO., LTD, Suzhou (CN)

( * ) Notice: Subject to any disclaimer, the term of this patent is extended or adjusted under 35 U.S.C. 154(b) by 0 days.

(21) Appl. No.: 18/861,785

(22) PCT Filed: Jul. 25, 2023

(86) PCT No.: PCT/CN2023/109079
§ 371 (c)(1),
(2) Date: Oct. 30, 2024

(87) PCT Pub. No.: WO2024/027529
PCT Pub. Date: Feb. 8, 2024

(65) Prior Publication Data
US 2025/0281162 A1    Sep. 11, 2025

(30) Foreign Application Priority Data
Aug. 5, 2022 (CN) .......................... 202210936540.5

(51) Int. Cl.
*A61B 8/00* (2006.01)
*G01S 15/89* (2006.01)
(Continued)

(52) U.S. Cl.
CPC ........ *A61B 8/5269* (2013.01); *G01S 15/8977* (2013.01); *G06T 5/50* (2013.01); *G06T 5/70* (2024.01); *G06T 2207/10132* (2013.01)

(58) Field of Classification Search
CPC .............. A61B 8/5269; G01S 15/8977; G06T 2207/10132; G06T 5/50; G06T 5/70
See application file for complete search history.

(56) References Cited

U.S. PATENT DOCUMENTS

2020/0138412 A1* 5/2020 Shin ...................... G06T 7/0012
2021/0386404 A1* 12/2021 Walker ................ G01S 7/52046

FOREIGN PATENT DOCUMENTS

CN       106236147 A       12/2016
CN       113687356 A       11/2021
(Continued)

*Primary Examiner* — Mark D Remaly
(74) *Attorney, Agent, or Firm* — Birch, Stewart, Kolasch & Birch, LLP

(57) ABSTRACT

The present application discloses an ultrasound beamforming method for suppressing clutter, comprising: obtaining channel data of ultrasound echo signals; applying a conventional apodization function to the channel data of the ultrasound echo signals to obtain a signal dataset, and applying a random apodization function to the channel data of the ultrasound echo signals to obtain a noise dataset, wherein the random apodization function is obtained by orthogonalization of the conventional apodization function; calculating correlation coefficients of the signal dataset and the noise dataset in two directions within a coordinate system; calculating processed spatial data for each point in the ultrasound echo signal channel data based on the correlation coefficients and the signal dataset; forming the ultrasound beam based on the processed spatial data to generate imaging data. The present application utilizes the wideband characteristics of the random window which, when used in conjunction with the conventional apodization function, can better suppress sidelobes while preserving the main lobe, thereby improving image contrast and spatial resolution.

20 Claims, 2 Drawing Sheets

(51) Int. Cl.
   *G06T 5/50*   (2006.01)
   *G06T 5/70*   (2024.01)

(56) References Cited

FOREIGN PATENT DOCUMENTS

| | | |
|---|---|---|
| CN | 115137392 A | 10/2022 |
| JP | 63-154165 A | 6/1988 |
| JP | 6-319735 A | 11/1994 |
| JP | 2003-79624 A | 3/2003 |
| JP | 2007-298503 A | 11/2007 |
| KR | 10-2022-0037835 A | 3/2022 |

\* cited by examiner

ULTRASOUND BEAMFORMING METHOD, SYSTEM, AND COMPUTER-READABLE MEDIUM FOR SUPPRESSING CLUTTER

TECHNICAL FIELD

The present application relates to the field of medical ultrasound systems, particularly to an ultrasound beamforming method, system, and computer-readable medium for suppressing clutter.

BACKGROUND

Conventional beamforming involves aligning channel data in time based on the geometric relationship between the transmit focus, receive focus, and ultrasound probe elements to calculate the time-of-arrival of sound waves. It then applies a receive apodization function and combines the data, known as Delay and Sum (DAS).

In practical ultrasound imaging, human tissue movement interference and complex acoustic impedance characteristics, coupled with the complex propagation properties of sound waves, result in scattering and multiple reflections. This leads to various interference noises. Traditional DAS methods cannot effectively remove these clutter signals, resulting in images with poor contrast and spatial resolution.

SUMMARY

The object of the present application is to provide an ultrasound beamforming method, system, and computer-readable medium for suppressing clutter.

To achieve this object, the present application provides an ultrasound beamforming method for suppressing clutter, comprising the steps of: obtaining channel data of ultrasound echo signals; applying a conventional apodization function to the channel data to obtain a signal dataset, and applying a random apodization function to the channel data to obtain a noise dataset, wherein the random apodization function is obtained by orthogonalization of the conventional apodization function; calculating correlation coefficients of the signal dataset and the noise dataset in two directions within a coordinate system; calculating processed spatial data for each point in the channel data based on the correlation coefficients and the signal dataset; forming the ultrasound beam based on the processed spatial data to generate imaging data.

As a further improvement of the present application, the method also includes: mapping the random apodization function onto the conventional apodization function to obtain a projection of the random apodization function on the conventional apodization function, and subtracting the projected random apodization function from the random apodization function to obtain the orthogonalized random apodization function.

As a further improvement of the present application, the method also includes: the conventional apodization function is at least one of a Hamming window function, a Hanning window function, or a Gaussian window function; the random apodization function is a uniformly distributed and linearly independent random matrix generated by linear congruential generator (LCG) method or RAND method.

As a further improvement of the present application, the method also includes: the orthogonalized random apodization function has a mean value of 0; the orthogonalized random apodization function used for each point in the ultrasound echo signal channel data is random, but consistent between frames of imaging data.

As a further improvement of the present application, the method also includes: the orthogonalization method adopts the Schmidt orthogonalization process.

As a further improvement of the present application, the method also includes: wherein "calculating processed spatial data for each point in the ultrasound echo signal channel data based on the correlation coefficients and the signal dataset" specifically includes: obtaining signal data components in the longitudinal axis direction of the signal data in the coordinate system; multiplying the signal data components by the correlation coefficient in that direction to obtain the processed spatial data for each point in the ultrasound echo signal channel data in the longitudinal axis direction.

As a further improvement of the present application, the method also includes: wherein "forming the ultrasound beam based on the processed spatial data to generate imaging data" specifically includes: aggregating the processed spatial data for each point in the longitudinal axis direction along the transverse axis direction to form the ultrasound beam and generate imaging data.

As a further improvement of the present application, the method also includes: performing envelope detection and logarithmic compression on the imaging data.

The present application also provides an ultrasound imaging system for suppressing clutter, comprising: a probe element module, an ultrasound echo receiving module, a channel data processing module, an imaging data conversion module, and an imaging data processing module. The system is used to execute any of the aforementioned ultrasound beamforming methods for suppressing clutter.

The present application further provides a computer-readable medium storing a computer program, which, when executed by a processor, implements the steps of any of the aforementioned ultrasound beamforming methods for suppressing clutter.

Compared to the prior art, the ultrasound beamforming method for suppressing clutter provided by the present application introduces a random window as a receive apodization function alongside the conventional apodization function. The random window has wideband characteristics, which, when combined with the conventional window function, can effectively suppress sidelobes and improve image contrast and spatial resolution. Additionally, due to the random phase introduced by the random function, when the conventional window function and random window are applied to the channel data to produce signal data and noise data respectively, the correlation coefficient calculated between these two types of data affects the signal data, influencing the phase distribution of the signal data. This weakens the impact of speckle noise on the image, thereby improving image quality.

DETAILED DESCRIPTION

The following detailed description of the present application will be made in conjunction with the accompanying drawings. However, these embodiments do not limit the present application. Any structural, methodological, or functional transformations made by those skilled in the art based on these embodiments are within the protection scope of the present application.

It should be noted that the term "include" or any of its variants is intended to cover non-exclusive inclusion, such that a process, method, article, or device that includes a series of elements not only includes those elements but also includes other elements not explicitly listed, or further includes elements inherent to such process, method, article, or device. In addition, terms such as "first," "second," etc., are used only for descriptive purposes and should not be understood as indicating or implying relative importance.

Figure 1:
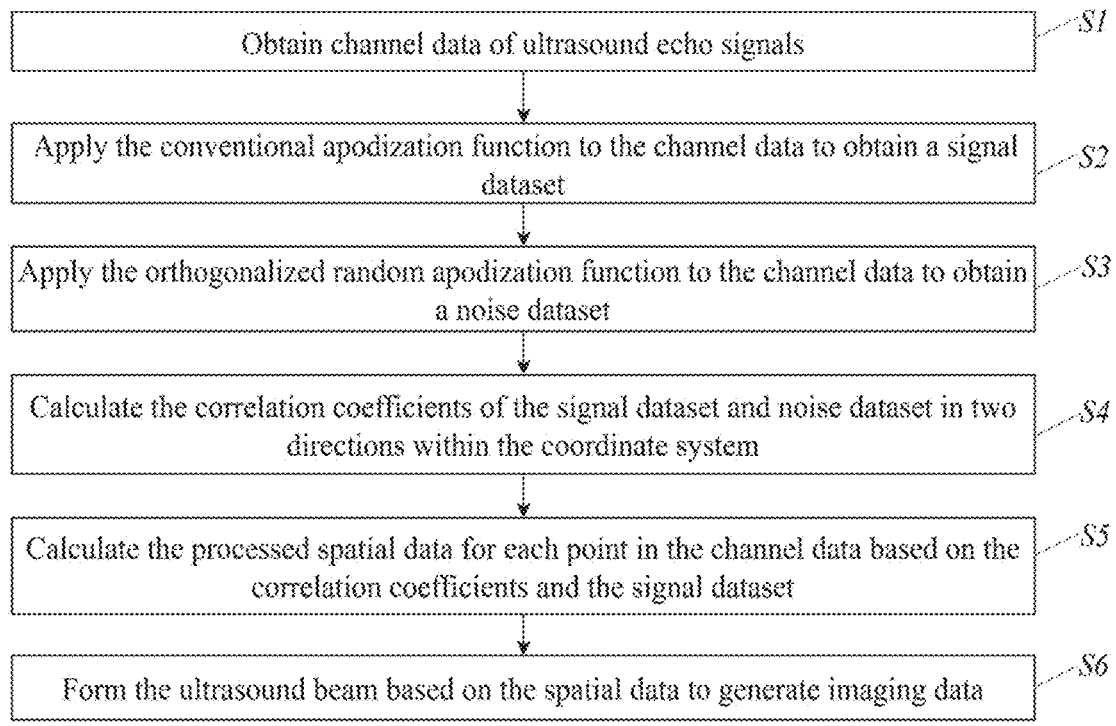
FIG. 1 is a flowchart of the ultrasound beamforming method for suppressing clutter according to an embodiment of the present application.

The present application discloses an embodiment of an ultrasound beamforming method for suppressing clutter. Although the present application provides method operation steps as described in the following embodiment or FIG. 1, based on conventional or non-inventive labor, the execution order of steps that do not have a necessary causal relationship in logic is not limited to the execution order provided in this embodiment. As shown in FIG. 1, an embodiment of the present application provides an ultrasound beamforming method for suppressing clutter, which includes several steps. Each step of the method is explained as follows:

Step S1: Obtain channel data of ultrasound echo signals;

For example, based on different application configurations, probe elements transmit ultrasound signals, and the receiving end obtains channel data according to the corresponding echo signals. In the ultrasound imaging system shown in FIG. 2, a certain number of probe element modules 100 are set up to transmit ultrasound waves at different spatial positions and angles. For N channels, with M sampling points per channel, one echo signal can obtain M*N channel sampling data. Here, N does not exceed the number of channels in the probe elements, and a value between 1 and the number of probe channels can be selected based on the application, with full channel usage being preferred.

Step S2: Apply the conventional apodization function to the channel data to obtain a signal dataset;

Specifically, the ultrasound echo receiving module 200 can use multi-channel signals reflected from the detection object to form a receive beam. For example, the multi-channel signals reflected from the detection object can be radio frequency (RF) signals. The RF signals are reflected by the detection object, then received by one or more transducers (not shown), and finally, multiple channel sampling data of the echo signal are obtained. Different conventional apodization functions are applied to these multiple channel sampling data, generating multiple signal data, which are then aggregated to obtain the signal dataset. For instance, conventional apodization functions may include Hamming window function, Hanning window function, or Gaussian window function.

Step S3: Apply the orthogonalized random apodization function to the channel data to obtain a noise dataset;

Specifically, after obtaining multiple channel sampling data of the echo signal, applying the conventional apodization function and the random apodization function to the channel data yields two signal space vectors: one called the signal space vector and the other called the noise space vector. These two window functions are not necessarily orthogonal. To obtain a purer noise space, the two window functions can be further optimized through orthogonalization. Using the Schmidt orthogonalization method, the noise space vector is mapped onto the signal space vector to obtain the projection of the noise space vector on the signal space vector. Subtracting this projection vector from the noise vector yields a pure noise vector, which is the orthogonalized random apodization function. For example, the random apodization function can be a uniformly distributed and linearly independent random matrix generated by the linear congruential generator (LCG) method or RAND method.

In a specific embodiment, the conventional apodization function uses the Hamming window function, and the random apodization function uses the rand( ) function in MATLAB. For example, the Hamming window function and random apodization function are defined as follows:

w1=hamming(N), w2=rand(N)

Using the Schmidt orthogonalization method, the orthogonalized random apodization function is obtained, which can be calculated using equation (1):

$$w2 = w2 - \frac{(w1, w2)}{(w1, w1)} w1 \quad (1)$$

Where w1 is the conventional apodization function, w2 is the orthogonalized random apodization function, and N is the number of channels.

In a specific embodiment, the channel data processing module 300 contains a signal data generator (not shown) that can produce two datasets. For example, the conventional apodization function w1 is applied to N channel data, resulting in N signal data, which are aggregated to obtain the signal dataset RF1. Similarly, the orthogonalized random apodization function w2 is applied to N channel data to obtain N noise data, which are aggregated to obtain the noise dataset RF2. RF1 and RF2 can be calculated using equations (2) and (3):

$$RF1 = \sum_{n=1}^{N} w1(n)x(n) \quad (2)$$

$$RF2 = \sum_{n=1}^{N} w2(n)x(n) \quad (3)$$

Where x(n) represents the nth channel data, w1(n) represents the Hamming function applied to the nth channel data, and w2(n) represents the orthogonalized random apodization function applied to the nth channel data.

In the coordinate system, to ensure that the orthogonalized random window is linearly independent in both horizontal and vertical directions, the orthogonalized random window applied to each sampling point of the channel data is random, but the random window used between each frame of the image remains consistent. For example, if the channel data has sampling points P1 and P2, when generating the first frame of the image, the orthogonalized random windows applied to P1 and P2 are random, let's say f1 and f2 respectively. However, when generating other frames, the random windows used for the corresponding sampling points P1 and P2 in other frames remain consistent with the first frame, i.e., f1 and f2 are still used. In other words, the orthogonalized random windows used for calculating the first frame of the image through various sampling points are all random, but for the sampling points corresponding to other frames, the orthogonalized random windows used are consistent with those of the first frame.

Step S4: Calculate the correlation coefficients of the signal dataset and noise dataset in two directions within the coordinate system;

Specifically, in the coordinate system, based on the obtained signal dataset RF1 and noise dataset RF2, calculate the correlation coefficients of the data points in the longitudinal axis direction at each point on the transverse axis for RF1 and RF2. This correlation coefficient will be high in the signal region but low in areas with sidelobes or other clutter.

As an example, the correlation coefficient can be calculated using equation (4):

$$\rho(n, \text{line}) = \frac{\sum_{i=n-K}^{n+K} RF1(i, \text{line})RF2(i, \text{line})}{\sqrt{\sum_{i=n-K}^{n+K} |RF1(i, \text{line})|^2} \sqrt{\sum_{i=n-K}^{n+K} |RF2(i, \text{line})|^2}} \quad (4)$$

Where, in the coordinate system, n represents the longitudinal axis direction, line represents the transverse axis direction, and K represents the number of points in the longitudinal axis direction participating in the correlation coefficient calculation. For example, when K=1, it means calculating the correlation coefficient of three points n−1, n, and n+1 in the longitudinal axis direction.

Step S5: Calculate the processed spatial data for each point in the channel data based on the correlation coefficients and the signal dataset;

Specifically, in the coordinate system, obtain the signal data components of the signal dataset in the longitudinal axis direction, multiply them by the correlation coefficients in the longitudinal axis direction to obtain the processed spatial data of the channel sampling data.

As an example, the processed spatial data can be calculated using equation (5):

$$RF(n, \text{line}) = \rho(n, \text{line})RF1(n, \text{line}) \quad (5)$$

The range of this correlation coefficient is between −1 and 1. If the correlation coefficient ρ is 1, then the two signals are identical; if the correlation coefficient ρ is close to or below 0, these two signals are considered uncorrelated; if the correlation coefficient ρ is between 0 and 1, these two signals are considered to have some relationship. This coefficient, when applied to the signal dataset, affects the phase distribution of the RF data, effectively suppressing clutter in the longitudinal axis direction while preserving the main lobe.

Step S6: Form the ultrasound beam based on the spatial data to generate imaging data.

Specifically, based on the processed spatial data of each channel sampling data obtained in Step S5, aggregate along the transverse axis direction to form the ultrasound beam, generating imaging data.

Figure 2:
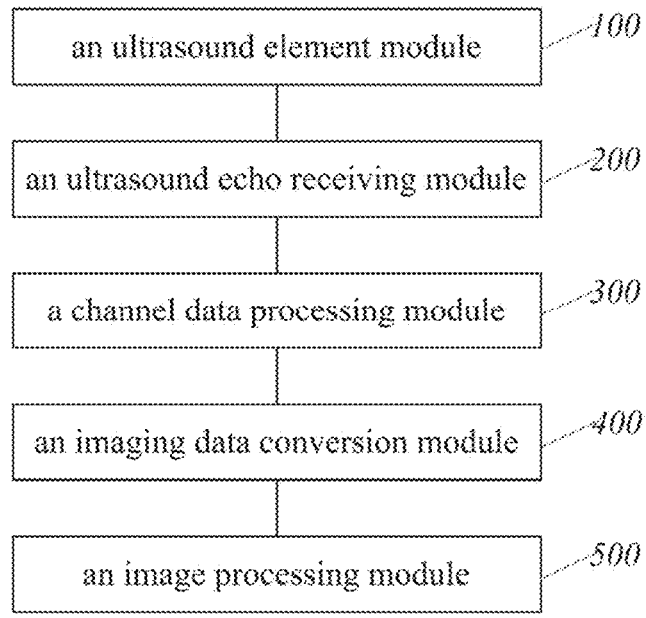
FIG. 2 is a schematic diagram of the ultrasound imaging system for suppressing clutter according to an embodiment of the present application.

An embodiment of the present application provides an ultrasound imaging system for suppressing clutter, as shown in FIG. 2, including: an ultrasound element module 100, for transmitting and receiving ultrasound signals; an ultrasound echo receiving module 200, for receiving echo signals acquired by transmitting ultrasound signals; a channel data processing module 300, for processing multiple channel data of ultrasound echo signals, which uses conventional apodization functions and random apodization functions to calculate beamformed signal data during processing, forming imaging data; an imaging data conversion module 400, for performing envelope detection and logarithmic compression on the imaging data to obtain processed imaging data; and an image processing module 500, for post-processing imaging data and generating images.

Figure 3:
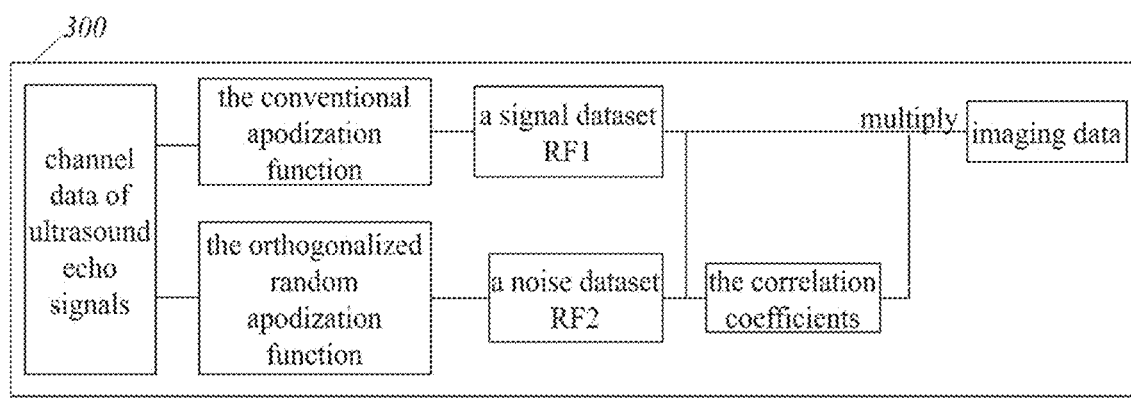
FIG. 3 is a schematic diagram of the channel data processing module according to an embodiment of the present application.

FIG. 3 shows an example of the channel data processing module 300. Referring to FIG. 3, after obtaining channel data of multiple ultrasound echo signals, the channel data processing module 300 uses conventional apodization functions to act on multiple channel data to obtain multiple signal data, which are aggregated to obtain the signal dataset RF1. Similarly, it uses orthogonalized random apodization functions to act on multiple channel data to obtain multiple noise data, which are aggregated to obtain the noise dataset RF2. In the coordinate system, it calculates the correlation coefficients of RF1 and RF2 in two directions. These correlation coefficients are multiplied by the signal dataset to obtain the processed spatial data for each point in the ultrasound echo signal channel data. Based on this processed spatial data, it aggregates along the transverse axis direction to form the ultrasound beam, generating imaging data.

The embodiment of the present application also provides a computer-readable medium storing a computer program, which, when executed by a processor, implements the steps of any of the aforementioned ultrasound beamforming methods for suppressing clutter. In other words, it implements the steps of any technical solution in the aforementioned ultrasound beamforming method for suppressing clutter.

In summary, the ultrasound beamforming method, system, and computer-readable medium for suppressing clutter provided by the present application first obtains channel data of ultrasound echo signals; selects two window functions, a conventional apodization function and a random apodization function, and uses Schmidt orthogonalization to calculate the orthogonal basis functions of these two window functions, obtaining an orthogonalized random apodization function; applies the conventional apodization function and the orthogonalized random apodization function to the channel data respectively to obtain the signal dataset RF1 and noise dataset RF2, and calculates the correlation coefficients between these two datasets; based on the correlation coefficients and signal dataset, performs ultrasound beamforming to generate imaging data. The present application utilizes the wideband characteristics of the random window which, when used in conjunction with the conventional apodization function, can better suppress sidelobes while preserving the main lobe, thereby improving image contrast and spatial resolution. Additionally, due to the random phase introduced by the random apodization function, the correlation coefficients, when applied to the signal data to obtain beamformed data, affect the phase distribution of the beamformed data, reducing the impact of speckle noise on the image and improving image quality.

It should be understood that although this specification describes the application according to embodiments, not every embodiment contains only one independent technical solution. This manner of description in the specification is merely for clarity. Those skilled in the art should consider the specification as a whole, and the technical solutions in various embodiments can also be appropriately combined to form other embodiments that can be understood by those skilled in the art.

The series of detailed descriptions listed above are merely specific explanations of feasible embodiments of the present application, and are not used to limit the scope of protection of the present application. Any equivalent implementations or modifications made without departing from the technical spirit of the present application should be included within the scope of protection of the present application.

What is claimed is:

1. An ultrasound beamforming method for suppressing clutter, wherein the method comprises:
   obtaining channel data of ultrasound echo signals;
   applying a conventional apodization function to the channel data of the ultrasound echo signals to obtain a signal dataset, and applying a random apodization function to the channel data of the ultrasound echo signals to obtain a noise dataset, wherein the random apodization function is obtained by orthogonalization of the conventional apodization function;
   calculating correlation coefficients of the signal dataset and the noise dataset in two directions within a coordinate system;
   calculating processed spatial data for each point in the ultrasound echo signal channel data based on the correlation coefficients and the signal dataset;
   forming the ultrasound beam based on the processed spatial data to generate imaging data.

2. The method according to claim 1, wherein the method further comprises:
   mapping the random apodization function onto the conventional apodization function to obtain a projection of the random apodization function on the conventional apodization function, and subtracting the projected random apodization function from the random apodization function to obtain the orthogonalized random apodization function.

3. The method according to claim 1, wherein the method further comprises:
   the conventional apodization function is at least one of a Hamming window function, a Hanning window function, or a Gaussian window function;
   the random apodization function is a uniformly distributed and linearly independent random matrix generated by linear congruential generator (LCG) method or RAND method.

4. The method according to claim 1, wherein the method further comprises:
   the orthogonalized random apodization function has a mean value of 0;
   the orthogonalized random apodization function used for each point in the ultrasound echo signal channel data is random, but consistent between frames of imaging data.

5. The method according to claim 1, wherein the method further comprises:
   the orthogonalization method adopts the Schmidt orthogonalization process.

6. The method according to claim 1, wherein "calculating processed spatial data for each point in the ultrasound echo signal channel data based on the correlation coefficients and the signal dataset" specifically includes:
   obtaining signal data components in the longitudinal axis direction of the signal data in the coordinate system;
   multiplying the signal data components by the correlation coefficient in that direction to obtain the processed spatial data for each point in the ultrasound echo signal channel data in the longitudinal axis direction.

7. The method according to claim 1, wherein "forming the ultrasound beam based on the processed spatial data to generate imaging data" specifically includes:
   aggregating the processed spatial data for each point in the longitudinal axis direction along the transverse axis direction to form the ultrasound beam and generate imaging data.

8. The method according to claim 7, wherein the method further comprises:
   performing envelope detection and logarithmic compression on the imaging data.

9. An ultrasound imaging system for suppressing clutter, wherein the system comprises: a probe element module, an ultrasound echo receiving module, a channel data processing module, an imaging data conversion module, and an imaging data processing module, wherein the system is used to execute the method of claim 1.

10. A computer-readable medium storing a computer program, wherein when the computer program is executed by a processor, it implements the steps of the ultrasound beamforming method for suppressing clutter according to claim 1.

11. The method according to claim 6, wherein "forming the ultrasound beam based on the processed spatial data to generate imaging data" specifically includes:
   aggregating the processed spatial data for each point in the longitudinal axis direction along the transverse axis direction to form the ultrasound beam and generate imaging data.

12. An ultrasound imaging system for suppressing clutter, wherein the system comprises: a probe element module, an ultrasound echo receiving module, a channel data processing module, an imaging data conversion module, and an imaging data processing module, wherein the system is used to execute the method of claim 2.

13. An ultrasound imaging system for suppressing clutter, wherein the system comprises: a probe element module, an ultrasound echo receiving module, a channel data processing module, an imaging data conversion module, and an imaging data processing module, wherein the system is used to execute the method of claim 3.

14. An ultrasound imaging system for suppressing clutter, wherein the system comprises: a probe element module, an ultrasound echo receiving module, a channel data processing module, an imaging data conversion module, and an imaging data processing module, wherein the system is used to execute the method of claim 4.

15. An ultrasound imaging system for suppressing clutter, wherein the system comprises: a probe element module, an ultrasound echo receiving module, a channel data processing module, an imaging data conversion module, and an imaging data processing module, wherein the system is used to execute the method of claim 5.

16. An ultrasound imaging system for suppressing clutter, wherein the system comprises: a probe element module, an ultrasound echo receiving module, a channel data processing module, an imaging data conversion module, and an imaging data processing module, wherein the system is used to execute the method of claim 6.

17. An ultrasound imaging system for suppressing clutter, wherein the system comprises: a probe element module, an ultrasound echo receiving module, a channel data processing module, an imaging data conversion module, and an imaging data processing module, wherein the system is used to execute the method of claim 7.

18. An ultrasound imaging system for suppressing clutter, wherein the system comprises: a probe element module, an ultrasound echo receiving module, a channel data processing module, an imaging data conversion module, and an imaging data processing module, wherein the system is used to execute the method of claim 8.

19. A computer-readable medium storing a computer program, wherein when the computer program is executed by a processor, it implements the steps of the ultrasound beamforming method for suppressing clutter according to claim 2.

20. A computer-readable medium storing a computer program, wherein when the computer program is executed by a processor, it implements the steps of the ultrasound beamforming method for suppressing clutter according to claim 3.

* * * * *